Patented June 9, 1925.

UNITED STATES PATENT OFFICE.

OSCAR GERLACH, OF LA SALLE, ILLINOIS.

ZINC-OXIDE-RECOVERY PROCESS AND BY-PRODUCTS THEREOF.

No Drawing.   Application filed December 4, 1920.   Serial No. 428,207.

*To all whom it may concern:*

Be it known that I, OSCAR GERLACH, a citizen of the Republic of Germany, and a resident of the city of La Salle, in the county of La Salle and State of Illinois, have invented certain new and useful Improvements in Zinc-Oxide-Recovery Processes and By-Products Thereof; and I do hereby declare that the following is a full, clear, and exact description of the same.

This invention relates to a process of recovering oxide of zinc from the waste of zinc smelters and zinc containing silicious refuse in which zinc is present in such small quantities that it ordinarily could not be recovered to commercial advantage. However, by the application of this improved process practically all of the zinc contained in the refuse is recovered and the refuse is formed into a product which is very valuable in itself.

An object of the invention therefore is the provision of a commercially practicable method for the recovery of the metal contained in the tailings and refuse from zinc smelters.

A further object of the invention is the provision of a method which in addition to recovering zinc oxide from said refuse forms the refuse into a product which is valuable as a cement.

A still further object of the invention is the provision of a method of recovering zinc oxide from mill refuse and the formation of a good grade of cement at the same time, which method is economical of operation and can be conducted at the same time that the oxidation of the zinc is in process or at other times, and in proximity to the mill.

Other and further important objects of this invention will be apparent from the disclosures in the accompanying specification.

The invention (in a preferred form) is more fully described in the following specification.

The process is as follows:

In the smelting of zinc appreciable quantities of the metal are retained in the ore whether the zinc is distilled in retorts or by a blast furnace. This zinc bearing refuse sometimes contains as much as 6 to 10% of metal but which is not available for the economical and practical recovery of the same by any method heretofore used.

In the process of distilling (smelting) zinc ore now mostly in use the ore is heated with carbon in the form of anthracite or coke screenings. The ore is mixed well with the anthracite or coke and the mixture charged into the retorts and upon application of heat the zinc is reduced by the carbon to the metallic state and then volatilized, after which it is caught in suitable receivers and condensed. The remaining ashes in the retort or furnace contain quite a substantial amount of unconsumed carbon and the residue of the ore together with the infusible material all of which contains in combination about 6 to 10% of zinc which is ordinarily not recoverable. The retorts are each originally charged with approximately sixty pounds of ore and from 25 to 28 pounds of coal. The residue is approximately 20 to 25 pounds per retort, which residue it will be seen represents a source of considerable loss, together with the inconvenience resulting from its proper disposal. It is impossible to recover any further zinc from the residue in the retort as too much heat would be required and the residue would thereupon flux or melt and form a layer or covering over the molten material which would then effectively prevent the vaporized zinc from coming off and therefore preclude its condensation and recovery. This residue and coal is screened and the larger chunks of coal recovered to be used over again, but most of the zinc remains in the fine material. This material is composed chiefly of fine carbon, silicates, aluminates, infusible ash and other impurities which are present in the ore. The fine carbon content is due to unburned particles of coal originally mixed with the ore.

It has been proposed to recover this comparatively large percentage of zinc from the refuse by means of the Wetherill or blast furnace process which, however, has been found to be impracticable as the material fluxes too easily and thereupon forms a crust over the surface of the melt which retains the zinc in combination by preventing the escape of the volatilized metal. It has been found, however, that the addition of lime or calcium carbonate to raise the fusing point of the slag will prevent such fluxing and will allow the zinc to be driven off in the form of vapor in practically one hundred per cent quantities of the metal which had been held in combination in the refuse. Upon further investigation it was found that if proper proportions of lime and calcium carbonate, together with some coal dust if necessary, were added to the refuse, and the whole well mixed, finely ground and then calcined a very good cement similar in action and quality to Portland cement was produced as a by-product of the zinc oxide recovery process especially when the mixture contained less than three per cent of magnesia and the proper proportion of lime to silica and alumina as provided by the specifications for the composition of a true Portland cement. Even when magnesia and iron are present in larger quantities, the resulting composition is a cement with excellent qualities and suitable for practically any purpose. In the calcining operation it will be understood that proper provision is of course made for the recovery of the vapors of the zinc oxide.

The best proportions of lime to the zinc residue has been found to be approximately 75% lime or calcium carbonate to 25% of the residue which ordinarily contains sufficient carbon, which, of course, can be supplemented if found necessary. These proportions depend to a great degree on the composition of the limerock and of the residue and may vary within wide limits. This is all finely ground together and subjected to calcination in a rotary kiln such as are well known in the art of calcination of cements. There are three distinct zones in the kiln in which the heat acts with different effects. In the first and upper zone into which the material comes the water present is vaporized and driven off. The next and hotter zone then acts to decompose the lime and drive off its carbon-dioxide together with the dehydration of any clay present and union begins in the lower and hottest zone between the acid and basic oxides, the silica, alumina, and ferric oxide acting in the first and the lime, magnesia and any alkalies in the second sense, until finally the material becomes slightly plastic, and full combination is effected at a point near the lower end of the kiln, where the temperature is highest. When a temperature of about 1800° F. and higher is attained the carbon acts upon the zinc oxide originally present in the ore and at this heat the zinc oxide is thereupon reduced to metallic zinc and vaporized and the vapors of the zinc are driven off, and upon coming into contact with free air are again partly burned to zinc oxide all of which vapors are carried away and recovered in a system of stacks or flues containing any suitable means for the retention of the zinc oxide such as filter cloths or the like. The cement clinker formed in the kiln is cooled and crushed to the requisite degree of fineness, when it is ready for use.

It will be seen that herein is provided a process whereby practically almost all of the zinc contained in the refuse from the smelters may be recovered by commercially practicable methods and which incidentally results in the production of a superior grade of cement which is especially adapted for use in salt water on account of the absence therefrom of appreciable quantities of those materials which would tend to form soluble chlorides. This cement may be made to correspond to the best grade of Portland cement which, of course, can be produced by using proper proportional quantities of material which will result in the production of a cement which has less than the maximum allowed proportion of magnesia therein and the proper calculated proportion of calcium content with regard to the silica and aluminum oxide content. It is obvious that this process may be applied to the recovery of other volatile metals besides zinc from similar refuse and with the production of a cement similar to the cement as described.

I am aware that many changes may be made and numerous details of this process may be varied through a wide range without departing from the principles of the invention, and I therefore do not purpose limiting the patent granted otherwise than necessitated by the prior art.

I claim as my invention:

The process for making cement and recovering zinc from silicious material containing zinc, the proportion of silica to the bases present being higher than that required for making cement, which consists in heating the material in the presence of oxygen, carbon and sufficient lime to form a clinker having a fusion point above the vaporization point of zinc, to a temperature at which the clinker sinters, collecting the zinc oxide fumes formed, cooling the clinker and grinding it.

In testimony whereof I have hereunto subscribed my name in the presence of two subscribing witnesses.

OSCAR GERLACH.

Witnesses:
C. H. ELLIS,
WM. A. FIELD.